United States Patent
Yamauchi

(10) Patent No.: US 9,063,365 B2
(45) Date of Patent: Jun. 23, 2015

(54) SCREEN AND IMAGE DISPLAY SYSTEM

(75) Inventor: Taisuke Yamauchi, Matsumoto (JP)

(73) Assignee: Seiko Epson Corporation (JP)

( * ) Notice: Subject to any disclaimer, the term of this patent is extended or adjusted under 35 U.S.C. 154(b) by 146 days.

(21) Appl. No.: 13/611,429

(22) Filed: Sep. 12, 2012

(65) Prior Publication Data

US 2013/0082986 A1 Apr. 4, 2013

(30) Foreign Application Priority Data

Sep. 30, 2011 (JP) ................................. 2011-218329

(51) Int. Cl.
*G09G 3/36* (2006.01)
*G02F 1/1334* (2006.01)
*G03B 21/56* (2006.01)
*H04N 9/31* (2006.01)
*G03B 21/62* (2014.01)

(52) U.S. Cl.
CPC .............. *G02F 1/1334* (2013.01); *G03B 21/56* (2013.01); *H04N 9/3102* (2013.01); *G03B 21/62* (2013.01)

(58) Field of Classification Search
CPC .............. G02F 1/1334; G02F 1/13718; G02F 1/13471; G02F 1/133377; G02F 1/133606; G02F 1/13475; G02F 1/13476; G02F 2001/13347; C09K 19/544; C09K 19/00
USPC .................................. 345/87, 204; 349/86, 88
See application file for complete search history.

(56) References Cited

U.S. PATENT DOCUMENTS

| | | | |
|---|---|---|---|
| 5,296,952 A * | 3/1994 | Takatsu et al. | 349/77 |
| 5,361,163 A | 11/1994 | Matsuda et al. | |
| 5,760,875 A | 6/1998 | Daijogo et al. | |
| 6,351,298 B1 * | 2/2002 | Mitsui et al. | 349/113 |
| 7,336,289 B2 | 2/2008 | Ishikawa et al. | |
| 7,623,203 B2 | 11/2009 | Hayashi et al. | |
| 7,850,304 B2 | 12/2010 | Jacobs et al. | |
| 8,408,720 B2 | 4/2013 | Nishigaki et al. | |
| 8,870,381 B2 | 10/2014 | Freeman et al. | |
| 2004/0160538 A1 * | 8/2004 | Li et al. | 349/16 |
| 2005/0259193 A1 * | 11/2005 | Sumiyoshi et al. | 349/62 |
| 2007/0091434 A1 | 4/2007 | Garner et al. | |
| 2008/0094551 A1 * | 4/2008 | Hayashi et al. | 349/106 |
| 2009/0167966 A1 * | 7/2009 | Nam et al. | 349/5 |
| 2010/0014319 A1 * | 1/2010 | Oversluizen et al. | 362/627 |
| 2011/0069242 A1 | 3/2011 | Mashitani et al. | |

FOREIGN PATENT DOCUMENTS

| | | |
|---|---|---|
| JP | 04-338937 B2 | 11/1992 |
| JP | 06-082748 | 3/1994 |
| JP | 10-036317 | 2/1998 |
| JP | 2008-102341 | 5/2008 |
| WO | 2004-021079 | 3/2004 |

* cited by examiner

*Primary Examiner* — Koosha Sharifi-Tafreshi
(74) *Attorney, Agent, or Firm* — Harness, Dickey & Pierce, P.L.C.

(57) ABSTRACT

A screen including a first liquid crystal layer area including a polymer dispersion liquid crystal material and capable of switching a state of the first liquid crystal layer area between a transmission state and a scatter state based on voltage application and a second liquid crystal layer area provided outside the first liquid crystal layer area, including a liquid crystal material and a dichromatic dye, and capable of switching a state of the second liquid crystal layer area between a transmission state and a colored state based on voltage application.

17 Claims, 7 Drawing Sheets

SCREEN AND IMAGE DISPLAY SYSTEM

BACKGROUND

1. Technical Field

The present invention relates to a screen and an image display system.

2. Related Art

There have been known technologies for displaying video images from a projector or any other apparatus on a screen. In recent years, there has been a proposed technology for displaying video images by using a screen capable of switching its state between a transmission (transparent) state and a scatter state and projecting video image light on the screen that operates in the scatter state. Using the technology to set the screen to be transparent when no video image is projected reduces a feeling of spatial oppression produced by the screen not in use. A screen capable of switching its state between the transmission (transparent) state and the scatter state by using a liquid crystal layer has been proposed (JP-A-6-82748, for example) as an example of the screen described above.

As the technology for switching the state of a screen between the transmission (transparent) state and the scatter state by using a liquid crystal layer, there is a known polymer dispersion liquid crystal display apparatus in which a liquid crystal material is dispersed in a polymer (JP-A-10-36317, for example). The principle according to which a polymer dispersion liquid crystal display apparatus of this type operates uses the difference in refractive index between the liquid crystal material and the polymer. In a normal mode, the transmission (transparent) state is created by applying an electric field, and the scatter state is created by removing the electric field. In a reverse mode, the transmission (transparent) state is created by applying no electric field, and the scatter state is created by applying an electric field. When the polymer dispersion liquid crystal display device is used as a screen, and video image light is projected on the screen that operates in the scatter state, a desired image is displayed on the screen. In the scatter state, however, surrounding external light is also scattered and disadvantageously decreases the contrast of the displayed image.

To suppress the decrease in contrast described above, there is a known method for introducing a black dichromatic dye into a polymer dispersion liquid crystal material. The method prevents surrounding external light from being scattered and the contrast of an image from being degraded. In a screen (polymer dispersion liquid crystal display device) into which a dichromatic dye is introduced, however, the dichromatic dye does not respond sufficiently fast because the motion of the dichromatic dye is restricted in the polymer. The reason for this is that a dichromatic dye is driven based on a guest-host effect, but the motion of the dichromatic dye is restricted when a polymer is present.

When the problem described above occurs, the transmittance of the screen (polymer dispersion liquid crystal display device) in the transmissive (transparent) state decreases, resulting in a difficulty in achieving a sufficiently transparent state.

SUMMARY

An advantage of some aspects of the invention is to provide a screen and an image display system capable of enhancing a contrast sensation based on a visual effect of human eyes and providing excellent transparency in a transmission state. A screen according to an aspect of the invention includes a first liquid crystal layer area including a polymer dispersion liquid crystal material and capable of switching a state of the first liquid crystal layer area between a transmission state and a scatter state based on voltage application and a second liquid crystal layer area provided outside the first liquid crystal layer area, including a liquid crystal material and a dichromatic dye, and capable of switching a state of the second liquid crystal layer area between a transmission state and a colored state based on voltage application.

In the screen described above, an image is displayed in the first liquid crystal layer area that operates in the scatter state, and the image is surrounded by the second liquid crystal layer area that operates in the colored state. The second liquid crystal layer area that operates in the colored state and surrounds the image gives an increased contrast sensation based on a visual effect of human eyes. Further, since the second liquid crystal layer area contains no polymer, the dichromatic dye can be appropriately moved based on a guest-host effect. As a result, the density of the displayed color can be increased (the transmittance of the displayed color can be reduced) in the colored state, whereas the transmittance can be increased in the transmission state. Moreover, when the first and second liquid crystal layer areas both operate in the transmission state, a feeling of oppression produced when the screen is not in use can be reduced.

It is preferable that the screen according to the aspect of the invention is capable of operating in a first state in which the first liquid crystal layer area operates in the scatter state and the second liquid crystal layer area operates in the colored state, and a second state in which the first and second liquid crystal layer areas both operate in the transmission state, and that an image is displayed in the first liquid crystal layer area that operates in the first state.

The thus configured screen can display an image that gives a high contrast sensation.

In the screen according to the aspect of the invention, it is preferable that the voltages are applied by common electrodes to the first and second liquid crystal layer areas.

The thus configured screen therefore has a simple apparatus configuration.

In the screen according to the aspect of the invention, it is preferable that the first state is produced when the voltages are applied, and that the second state is produced when no voltage is applied.

In the configuration described above, an image can be displayed when the voltages are applied. In this case, the screen is advantageously used in an application in which the period during which an image is displayed is shorter than the period during which no image is displayed.

In the screen according to the aspect of the invention, it is preferable that the second state is produced when the voltages are applied, and that the first state is produced when no voltage is applied.

In the configuration described above, an image can be displayed when no voltage is applied. In this case, the screen is advantageously used in an application in which the period during which an image is displayed is longer than the period during which no image is displayed.

In the screen according to the aspect of the invention, it is preferable that the voltages are applied by different electrodes independently of each other to the first and second liquid crystal layer areas.

In the configuration described above, the state of the first liquid crystal layer area and the state of the second liquid crystal layer area can be controlled independently of each other.

In the screen according to the aspect of the invention, it is preferable that a color displayed in the colored state is black. A displayed image can thus give a further increased contrast sensation.

An image display system according to another aspect of the invention includes the screen according to the aspect of the invention, a projector that displays an image on the screen, and a controller that controls operation of driving the screen and the projector.

The thus configured image display system can give an increased contrast sensation based on a visual effect of human eyes. In the image display system according to the aspect of the invention, it is preferable that the controller instructs the screen to operate in the first state, in which the first liquid crystal layer area operates in the scatter state and the second liquid crystal layer area operates in the colored state, in response to outputting an image signal to the projector.

In the thus configured image display system, the screen and the projector are driven in synchronization with each other, whereby the screen operates in the first state only when an image is displayed on the screen. That is, when no image is displayed on the screen, the screen operates in a transparent state (state in which first and second liquid crystal layer areas both operate in transmission state), whereby a feeling of oppression produced in this state can be reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Screens and image display systems according to preferable embodiments of the invention will be described below in detail with reference to the drawings.

First Embodiment

Figure 1:
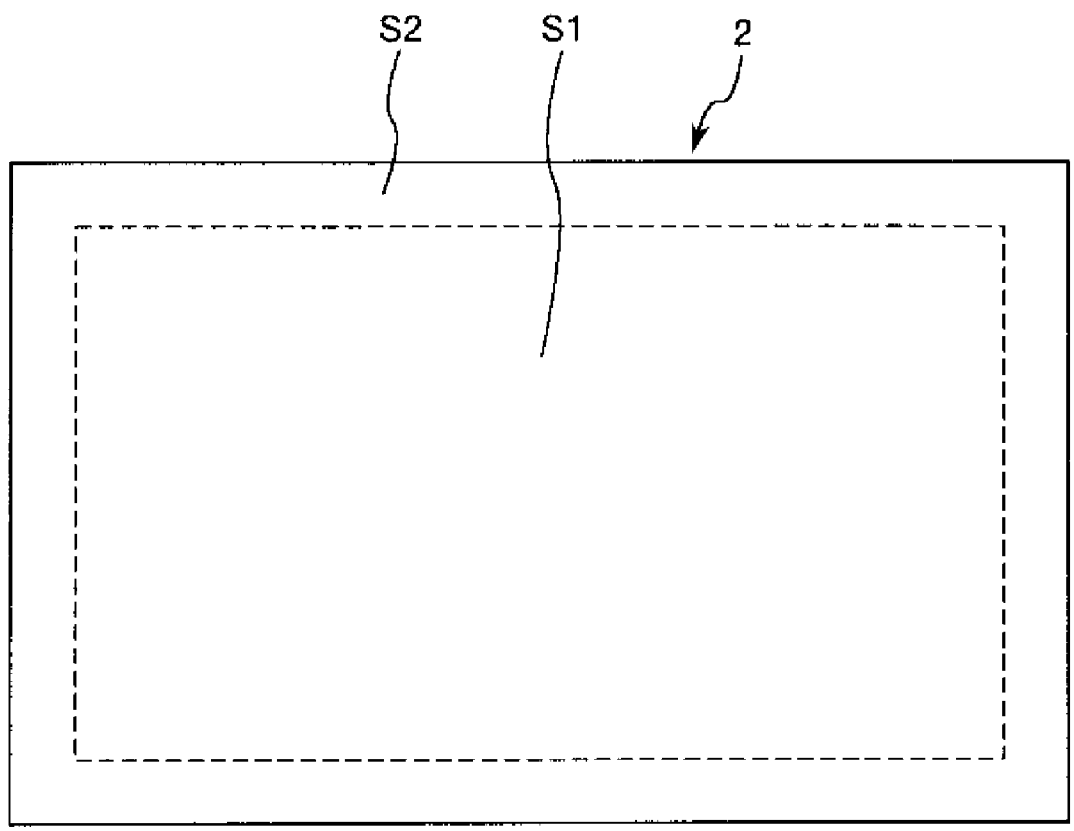
FIG. 1 is a plan view of a screen according to a first embodiment of the invention.
Figure 2:
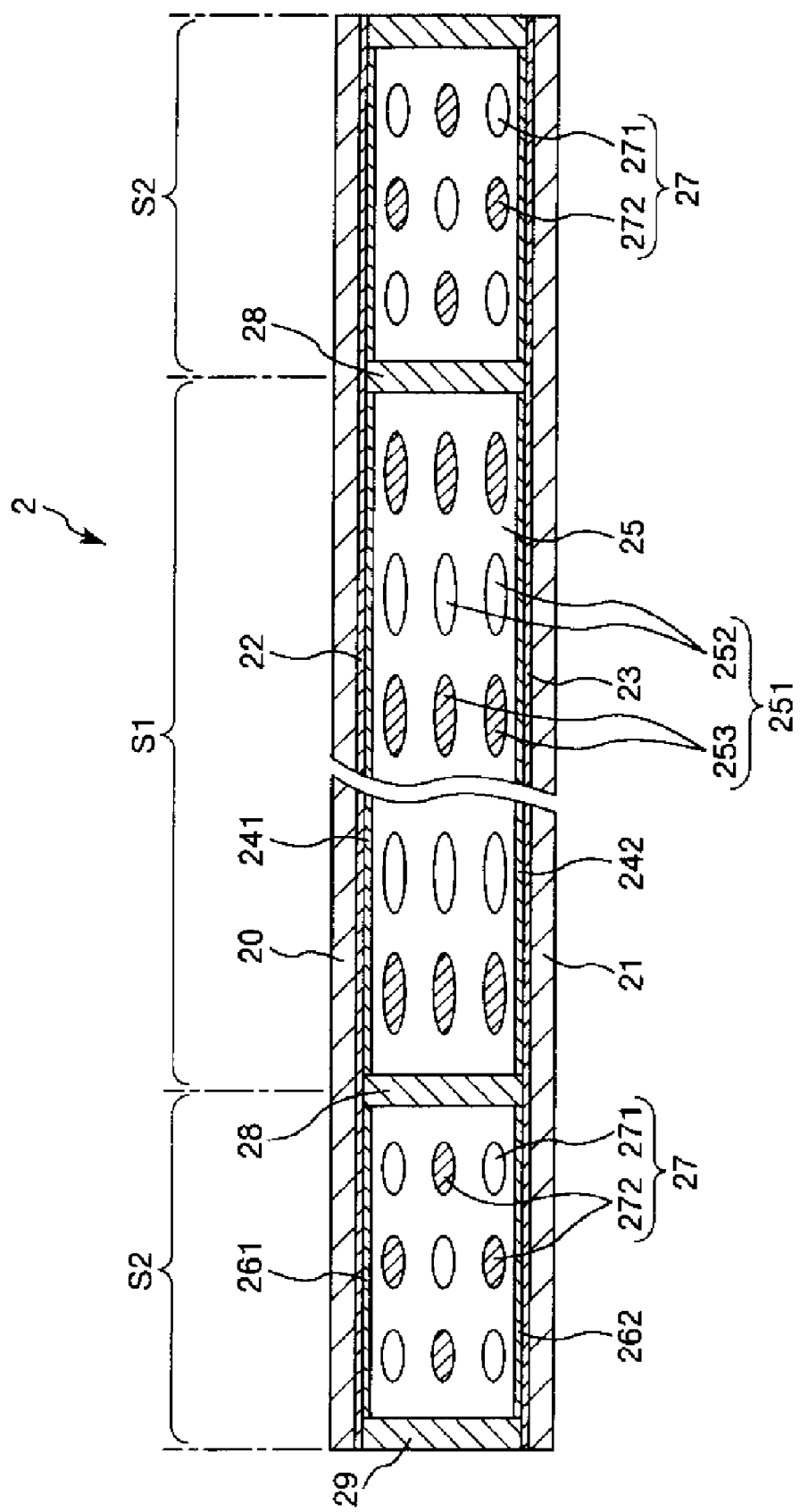
FIG. 2 is a cross-sectional view of the screen shown in FIG. 1.
Figure 3A:
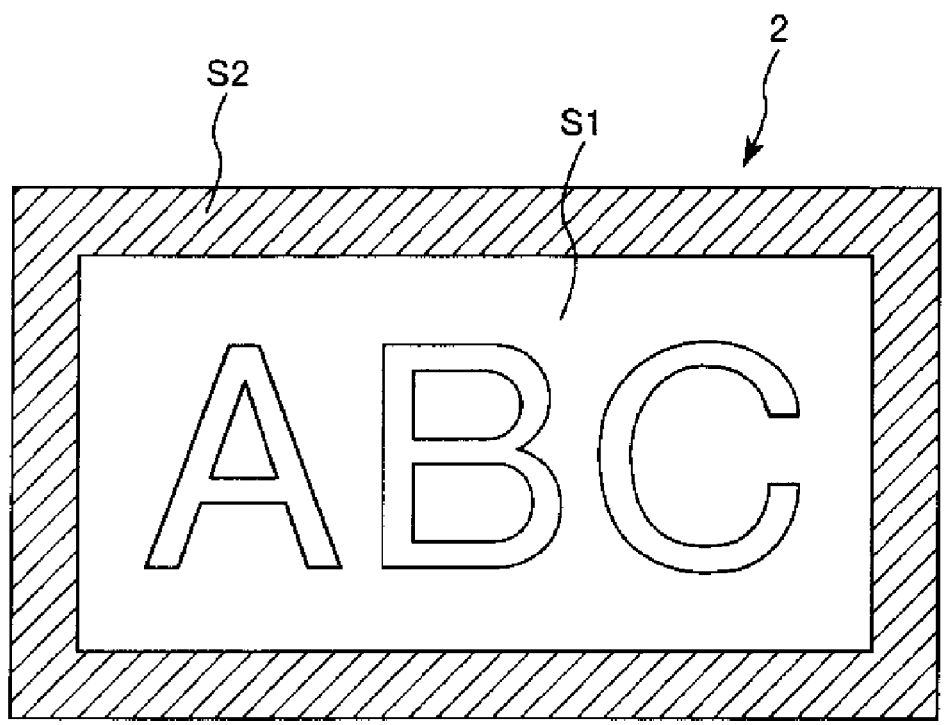
FIGS. 3A and 3B are plan views for describing the operation of driving the screen shown in FIG. 1.
Figure 3B:
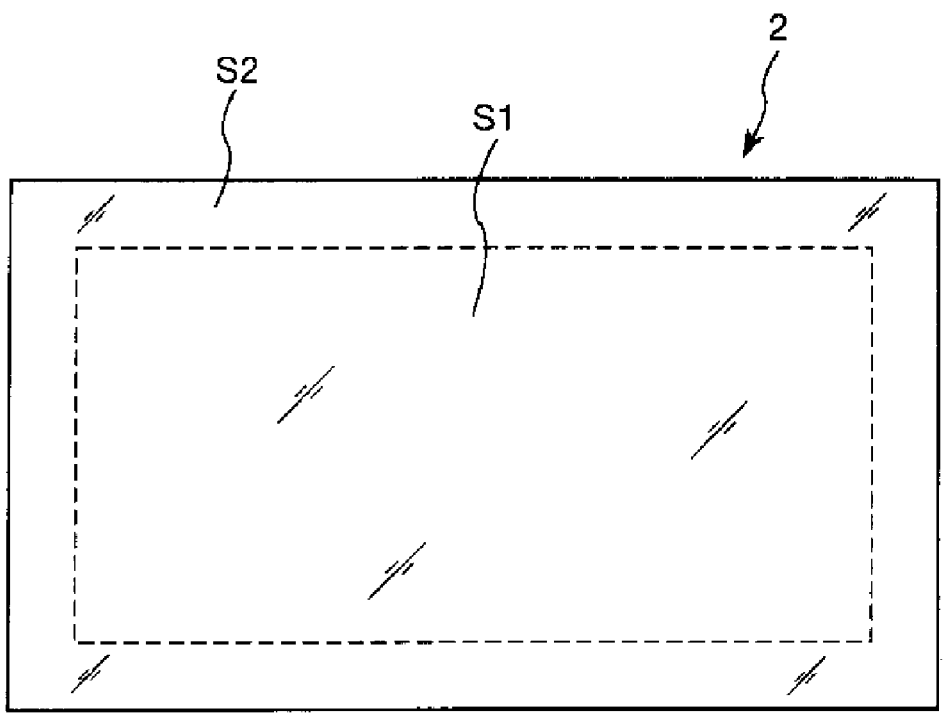
Figure 4:
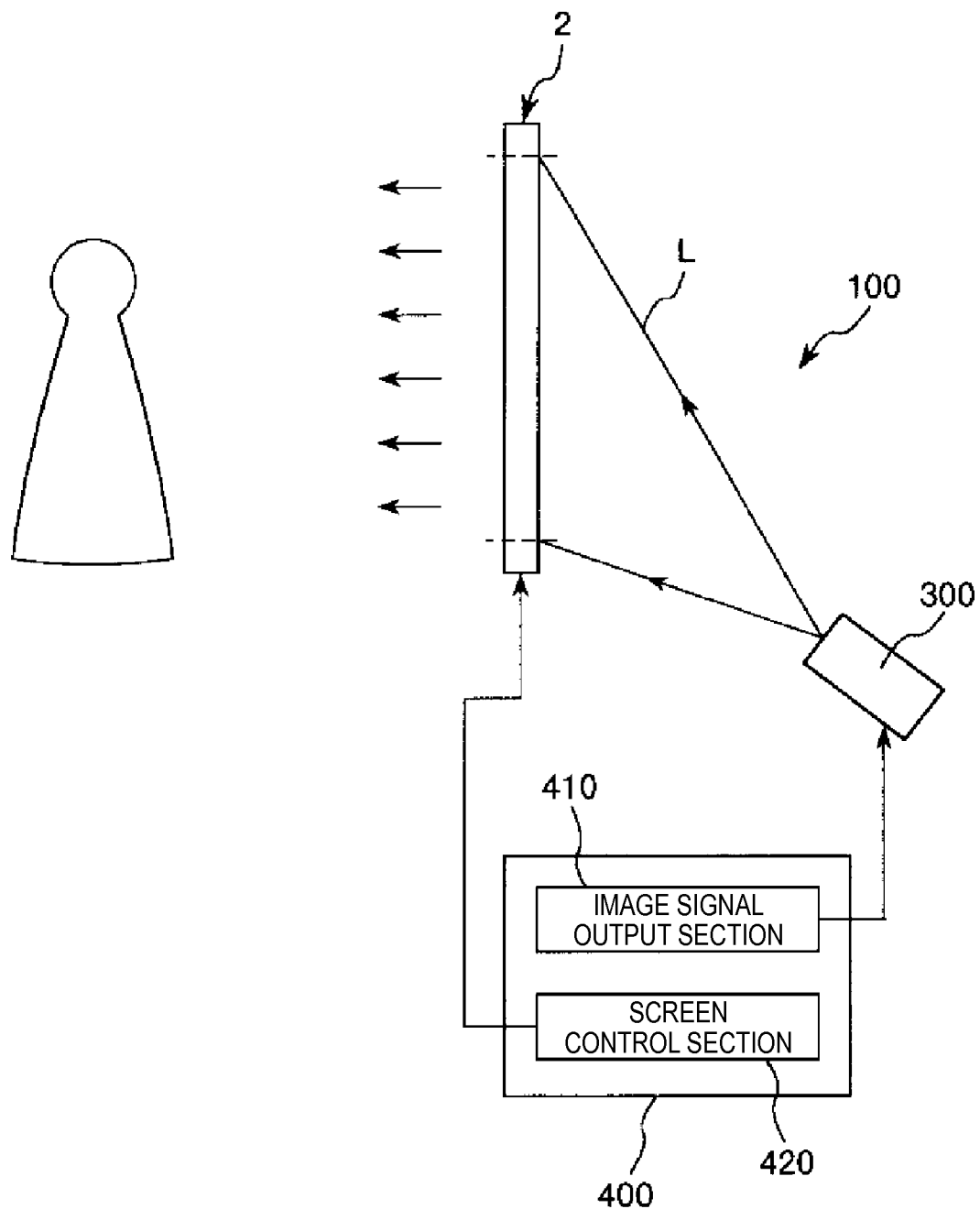
FIG. 4 is a configuration diagram of an image display system into which the screen shown in FIG. 1 is incorporated.
Figure 5:
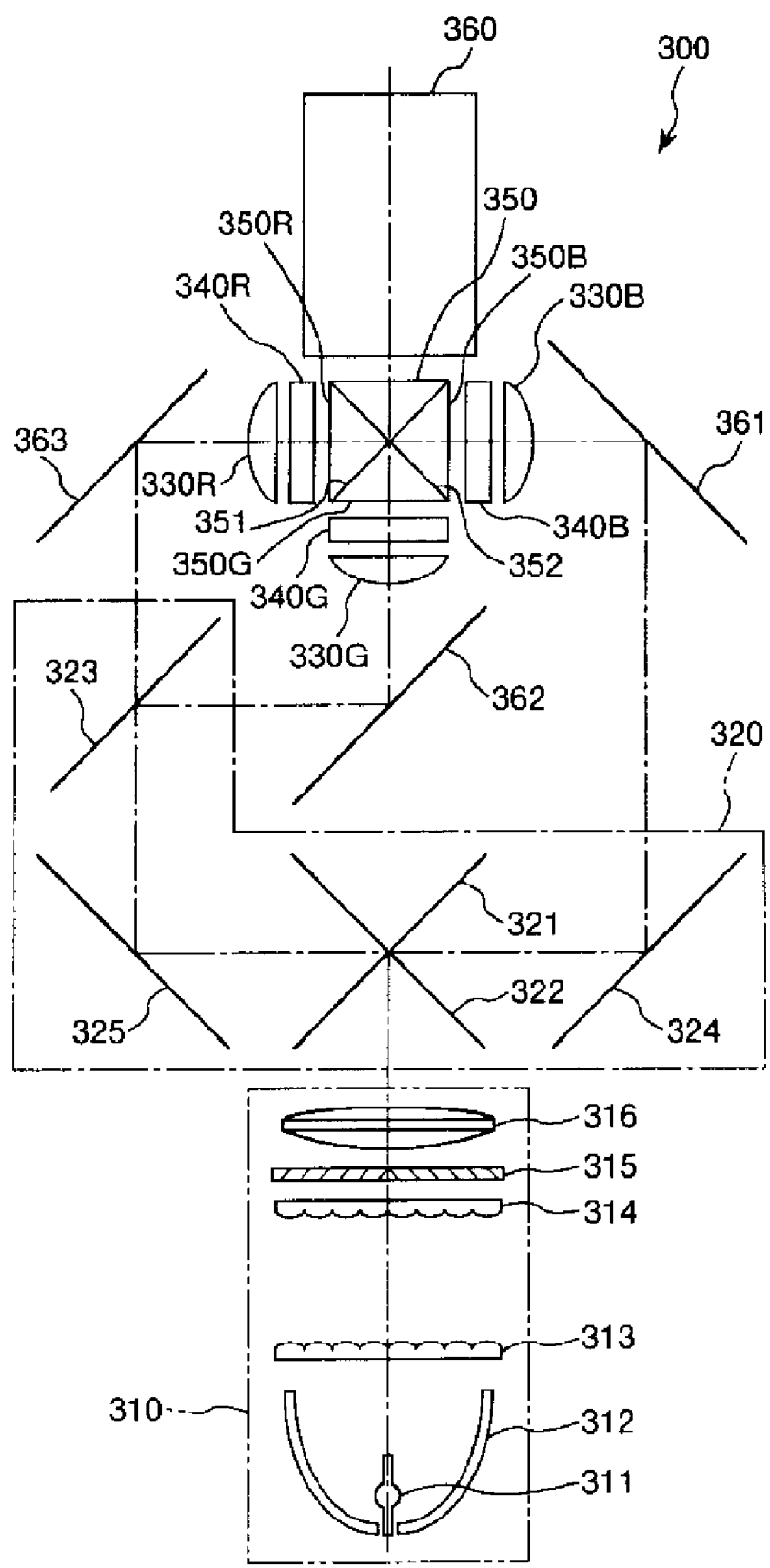
FIG. 5 is a plan view showing the configuration of an optical system of a projector shown in FIG. 4.

FIG. 1 is a plan view showing a screen according to a first embodiment of the invention. FIG. 2 is a cross-sectional view of the screen shown in FIG. 1. FIGS. 3A and 3B are plan views for describing the operation of driving the screen shown in FIG. 1. FIG. 4 is a configuration diagram of an image display system into which the screen shown in FIG. 1 is incorporated. FIG. 5 is a plan view showing the configuration of an optical system of a projector shown in FIG. 4.

1. Screen

A screen 2 includes a pair of transparent substrates 20 and 21, a pair of transparent electrodes 22 and 23, and a sealing portion 29 that seals the space between the pair of transparent substrates 20 and 21, as shown in FIGS. 1 and 2. The transparent electrode 22 is formed on the surface of the transparent substrate 20 that faces the transparent substrate 21, and the transparent electrode 23 is formed on the surface of the transparent substrate 21 that faces the transparent substrate 20.

The transparent substrates 20 and 21 have a function of supporting the transparent electrodes 22 and 23 and orientation films 241 and 242, which will be described later. The transparent substrates 20 and 21 are made, for example, of, but not necessarily, quartz glass or any other suitable glass material or polyethylene terephthalate or any other suitable plastic material. Among the materials described above, in particular, quartz glass or any other suitable glass material is preferably used and forms the screen 2 that does not tend to warp, bend, or otherwise deform but excels in stability. The transparent electrodes 22 and 23 are conductive and made, for example, of an indium tin oxide (ITO), an indium oxide (IO), or a tin oxide ($SnO_2$).

The screen 2 has a first liquid crystal layer area S1 set in a central portion except peripheral portions of the transparent substrates 20 and 21 and a second liquid crystal layer area S2 set at the peripheral portions of the transparent substrates 20 and 21 having a frame-like shape and surrounding the first liquid crystal layer area S1 in a plan view. A partition (seal member) 28 that partitions the screen 2 into the first liquid crystal layer area S1 and the second liquid crystal layer area S2 is provided between the pair of transparent substrates 20 and 21.

The first liquid crystal layer area S1 is an image display section where an image (video images) is displayed by a projector, which will be described later, and the second liquid crystal layer area S2 is an area where a frame that surrounds the image display section is formed. When an image is displayed in the image display section (first liquid crystal layer area 51), the frame (second liquid crystal layer area S2) is colored, for example, black. The colored frame improves the contrast of the image displayed in the image display section based on a visual effect of human eyes.

The width of the second liquid crystal layer area S2 is not limited to a specific value and is preferably greater than or equal to about 1 cm but smaller than or equal to about 10 cm depending on the size of the screen 2. The thus set width makes the black frame large enough to provide the effect described above and ensures a sufficiently large size of the first liquid crystal layer area (image display section).

The pair of orientation films 241 and 242 and a first liquid crystal layer 25 positioned therebetween are provided between the transparent substrates 20 and 21 in the first liquid crystal layer area 51. Each of the orientation films 241 and 242 is, for example, a polyimide film or any other suitable film on which rubbing or any other suitable orientation process is performed.

The first liquid crystal layer 25 contains a PDLC (polymer dispersion liquid crystal) material 251, and the state of the liquid crystal layer 25 can be switched between a transmission (transparent) state and a scatter state by changing the magnitude of an electric field applied thereto. The PDLC 251 includes polymer portions 252 and liquid crystal portions 253 and can be formed, for example, by mixing a liquid crystalline monomer or any other suitable polymer precursor with a liquid crystal molecule. To form the PDLC 251, the mixture is allowed to undergo an orientation process by using the orientation films 241 and 242 and so irradiated with ultraviolet light or any other form of energy that the liquid crystalline monomer is polymerized. The thus polymerized and oriented liquid crystalline monomer forms the polymer portions 252 having an orientation anchoring force. The liquid crystal molecule is separated from the polymer portions 252 in a phase separation process to form the liquid crystal portions 253, which are oriented by the orientation anchoring force of the polymer portions 252.

The PDLC 251 in the present embodiment is of reverse type, which means that the first liquid crystal layer 25 operates in the transmission state, in which the first liquid crystal layer 25 is transmissive, in a state in which no voltage is applied, whereas the first liquid crystal layer 25 operates in the scatter state, in which the first liquid crystal layer 25 is diffusive, in a state in which a voltage is applied. Specifically, in the no voltage applied state, since the liquid crystal portions 253 are oriented in the same direction as the polymer portions 252, the refractive index continuously changes at the boundaries between the liquid crystal portions 253 and the polymer portions 252 (the refractive index of the liquid crystal portions 253 is substantially equal to that of the polymer portions 252) and light incident on the PDLC 251 is hardly diffused but directly exits out thereof or the screen 2 operates in the transmission state. Conversely, in the voltage applied state, the azimuth of the polymer molecules in the polymer portions 252 does not change, whereas the azimuth of the liquid crystal molecules in the liquid crystal portions 253 changes in accordance with the electric field, whereby the refractive index discontinuously changes at the boundaries between the polymer portions 252 (the refractive index of the liquid crystal portions 253 is different from that of the polymer portions 252) and the liquid crystal portions 253 and the incident light is scattered before it exits out of the PDLC 251 or the screen 2 operates in the scatter state.

A pair of orientation films 261 and 262 and a second liquid crystal layer 27 positioned therebetween are provided between the transparent substrates 20 and 21 in the second liquid crystal layer area S2. The second liquid crystal layer 27 is what is called a guest-host liquid crystal layer containing a liquid crystal (host liquid crystal) material 271 and a dichromatic dye 272. The liquid crystal material 271, the orientation of which is changed when an electric field is present, has a function of controlling the orientation of the dichromatic dye 272 dissolved as a guest. The liquid crystal material 271 is not limited to a specific one and may, for example, be a nematic liquid crystal material or a smectic liquid crystal material.

On the other hand, the dichromatic dye 272 is a dye molecule that is dissolved in the liquid crystal material 271 and absorbs light of a specific color by a variable amount according to the orientation of the molecule. In the following description, the axis of the dichromatic dye 272 along which light of a specific color is absorbed is called a "light absorption axis," and light that intersects the light absorption axis is absorbed. The dichromatic dye 272 in the present embodiment has an elongated rod-like shape having a major axis and a minor axis, and the major axis of the dichromatic dye 272 is the light absorption axis.

The dichromatic dye 272 in the second liquid crystal layer 27 preferably has the following dyes mixed therein: a first dichromatic dye having an absorption maximum in a yellow region, a second dichromatic dye having an absorption maximum in a magenta region, and a third dichromatic dye having an absorption maximum in a cyan region. The dichromatic dye 272 having the first, second, and third dichromatic dyes mixed at an appropriately selected ratio can operate in a colored state that displays a desired color. The color displayed in the colored state is not limited to a specific color but is preferably black.

Examples of the dichromatic dye 272 may include an azoic dye, an anthraquinone dye, a perylene dye, a merocyanine dye, an azomethine dye, a phthaloperylene dye, an indigo dye, an azulene dye, a dioxazine dye, a polythiophene dye, and a phenoxazine dye.

The second liquid crystal layer 27 in the present embodiment is of VA (vertical alignment) type, which means that the second liquid crystal layer 27 operates in the transmission state, in which the second liquid crystal layer 27 is transmissive, in a state in which no voltage is applied, whereas the second liquid crystal layer 27 operates in the colored state, in which the second liquid crystal layer 27 displays a predetermined color, in a state in which a voltage is applied. Specifically, in the no voltage applied state, the liquid crystal material 271 is oriented vertically, and the dichromatic dye 272 follows the vertical orientation of the liquid crystal material 271 or the screen 2 operates in the transmission state. Conversely, in the voltage applied state, the liquid crystal material 271 is oriented horizontally, and the dichromatic dye 272 follows the horizontal orientation of the liquid crystal material 271 or the screen 2 operates in the colored (black) state. It is noted that the second liquid crystal layer 27 is not limited to a VA liquid crystal layer and may be any liquid crystal layer that operates in the transmission state in the no voltage applied state whereas operating in the colored state in the voltage applied state.

In the thus configured second liquid crystal layer 27, the orientation of the dichromatic dye 272 can be reliably changed based on the guest-host effect, whereby the transmission state and the colored state can be reliably and clearly switched. That is, the transmittance in the transmission state can be increased, whereas the light absorbance in the colored state can be increased.

In the thus configured screen 2, the pair of common transparent electrodes 22 and 23 create an electric field acting on the first liquid crystal layer area S1 and the second liquid crystal layer area S2. The screen 2 can therefore operate in one of the following states at a time: an electric field created state in which a voltage is applied between the transparent electrodes 22 and 23 so that an electric field acts on the first liquid crystal layer area S1 and the second liquid crystal layer area S2 and a no electric field created state in which no voltage is applied between the transparent electrodes 22 and 23 so that no electric field acts on the first liquid crystal layer area S1 or the second liquid crystal layer area S2.

The "no electric field created state" described above includes not only a state in which no electric field is crated at all but also a state in which a voltage smaller than the voltage applied in the electric field created state is applied between the pair of transparent electrodes 22 and 23 so that an electric field less intense than that in the electric field created state is created.

In the electric field created state, the first liquid crystal layer area S1 operates in the scatter state and the second liquid crystal layer area S2 operates in the colored state (the overall state is called a "first state"), as shown in FIG. 3A. An image can therefore be displayed in the first liquid crystal layer area S1. Further, the displayed image can be surrounded by the black frame formed of the second liquid crystal layer area S2. Conversely, in the no electric field created state, the first liquid crystal layer area S1 and the second liquid crystal layer area S2 both operate in the transmission state (the overall state is called a "second state"), as shown in FIG. 3B. The screen 2 thus operates in the transparent state. The screen 2, which is capable of switching its state between the first and second states, provides the following advantageous effects.

First, the screen 2 can be transparent when the screen 2 is not in use and is driven to operate in the second state. A feeling of oppression produced by the screen 2 can therefore be reduced, for example, when the screen 2 is used in a space where the user lives.

In particular, since the second liquid crystal layer area S2 of the screen 2 contains no polymer, the dichromatic dye can be appropriately moved based on a guest-host effect. As a result, the density of the displayed color can be increased (the transmittance of the displayed color can be reduced) in the colored state, whereas the transmittance can be increased in the transmission state. Further, since the first liquid crystal layer area S1 contains no dichromatic dye, the transmittance can be further increased in the transmission state.

Second, when the screen 2 is in use, the screen 2 is driven to operate in the first state, whereby the second liquid crystal layer area S2 around the first liquid crystal layer area S1 works as a colored frame. As a result, an image displayed in the first liquid crystal layer area S1 gives an improved contrast sensation based on a visual effect of human eyes. In particular, the effect is more noticeable when the displayed color in the colored state is black.

Further, in the screen 2 according to the present embodiment, which is so configured that the common electrodes (transparent electrodes 22 and 23) apply a voltage to the first liquid crystal layer area S1 and the second liquid crystal layer area S2, the first state is achieved simply by applying a voltage to the transparent electrodes 22 and 23. The operation of driving the screen 2 is therefore more readily controlled. It is noted that the screen 2 described above is preferably used in an application in which the period during which an image is displayed on the screen 2 (period during which screen 2 operates in first state) is shorter than the period during which no image is displayed on the screen 2 (period during which screen 2 operates in second state). The screen 2 can thus be driven in a power-saving mode.

2. Image Display System

An image display system 100 into which the screen 2 is incorporated will next be described.

The image display system 100 includes the screen 2, a projector 300 that displays an image on the screen 2, and a controller 400 that controls the operation of driving the screen 2 and the projector 300, as shown in FIG. 4. In the image display system 100, an image is projected from the side of the screen 2 that faces away from a viewer on the rear surface of the screen (surface facing away from viewer). An image may alternatively be projected from the side of the screen 2 that faces the viewer on the front surface of the screen 2 (surface facing viewer).

The projector 300 is not limited to a specific one and can be any projector that can display an image on the screen 2. For example, an illumination projection projector that enlarges and projects an image formed by a spatial light modulator on the screen 2 or a scanning projector that scans the screen 2 with light to form an image may be used. An example of the projector 300 will be shown below.

FIG. 5 is a plan view showing the configuration of an optical system of the projector 300. The projector 300 includes an illumination system 310, a color separation system 320, parallelizing lenses 330R, 330G, and 330B, spatial light modulators 340R, 340G, and 340B, and a cross dichroic prism 350, which is a light combiner, as shown in FIG. 5.

The illumination system 310 includes a light source 311, a reflector 312, a first lens array 313, a second lens array 314, a polarization conversion element 315, and a superimposing lens 316.

The light source 311 is an ultra-high pressure mercury lamp, and the reflector 312 is formed of a parabolic mirror. A divergent light flux emitted from the light source 311 is reflected off the reflector 312 and forms a substantially parallelized light flux, which is directed toward the first lens array 313. The light source 311 is not limited to an ultra-high pressure mercury lamp but may alternatively be, for example, a metal halide lamp. Further, the reflector 312 is not limited to a parabolic mirror but may alternatively be an ellipsoidal mirror reflector with a parallelizing concave lens disposed on the side where the light-exiting surface thereof is present.

Each of the first lens array 313 and the second lens array 314 is formed of lenslets arranged in a matrix. The light flux emitted from the light source 311 is divided by the first lens array 313 into a plurality of thin partial light fluxes, which are superimposed on the surfaces of the three spatial light modulators 340R, 340G, and 340B, which are illuminated with light traveling through the second lens array 314 and the superimposing lens 316.

The polarization conversion element 315 has a function of aligning randomly polarized light fluxes with each other to produce linearly polarized light oscillating in a single direction (S-polarized light or P-polarized light). In the present embodiment, the polarization conversion element 315 produces S-polarized light because the intensity thereof is not greatly reduced in the color separation system 320.

The color separation system 320 has a function of separating the light flux having exited out of the illumination system 310 (S-polarized light) into red (R), green (G), and blue (B), three color light fluxes. To this end, the color separation system 320 includes a B-light reflecting dichroic mirror 321, an RG-light reflecting dichroic mirror 322, a G-light reflecting dichroic mirror 323, and reflection mirrors 324 and 325.

Among the light fluxes having exited out of the illumination system 310, the B-light component is reflected off the B-light reflecting dichroic mirror 321, further reflected off the reflection mirror 324 and a reflection mirror 361, and reaches the parallelizing lens 330B. On the other hand, among the light fluxes having exited out of the illumination system 310, the G-light and R-light components are reflected off the RG-light reflecting dichroic mirror 322, further reflected off the reflection mirror 325, and reaches the G-light reflecting dichroic mirror 323. The G-light component of the light having reached the G-light reflecting dichroic mirror 323 is reflected off the G-light reflecting dichroic mirror 323 and a reflection mirror 362 and reaches the parallelizing lens 330G, whereas the R-light component of the light having reached the G-light reflecting dichroic mirror 323 passes through the G-light reflecting dichroic mirror 323, is reflected off a reflection mirror 363, and reaches the parallelizing lens 330R.

The parallelizing lenses 330R, 330G, and 330B are so configured that the plurality of partial light fluxes having exited out of the illumination system 310 are substantially parallelized and illuminate the spatial light modulators 340R, 340G, and 340B in a satisfactory manner.

The R light having passed through the parallelizing lens 330R reaches the spatial light modulator 340R. The G light having passed through the parallelizing lens 330G reaches the spatial light modulator 340G. The B light having passed through the parallelizing lens 330B reaches the spatial light modulator 340B.

The spatial light modulator 340R, which modulates the R light in accordance with an image signal, is a transmissive liquid crystal display device. A liquid crystal panel (not shown) provided in the spatial light modulator 340R includes two transparent substrates and a liquid crystal layer sealed therebetween for modulating light in accordance with the image signal. The R light modulated by the spatial light modulator 340R is incident on the cross dichroic prism 350, which is a light combining system. The configuration and function of each of the spatial light modulators 340G and 340B are the same as those of the spatial light modulator 340R.

The cross dichroic prism 350 is formed by bonding four triangular prisms into a rectangular column having a substantially square cross-sectional shape, and dielectric multilayer films 351 and 352 are formed along the X-shaped bonded surfaces. The dielectric multilayer film 351 transmits G light and reflects R light, and the dielectric multilayer film 352 transmits G light and reflects B light. The cross dichroic prism 350 combines the modulated color light fluxes having exited from the spatial light modulators 340R, 340G, and 340B and impinged on light incident surfaces 350R, 350G, and 350B to form video image light representing a color image and directs the video image light to a projection optical unit 360.

The projector 300 thus outputs video image light L, which is linearly polarized light.

The controller 400 includes an image signal output section 410 that outputs an image signal to the projector 300 and a screen control section 420 that controls the operation of driving the screen 2 (ON/OFF), as shown in FIG. 4. The projector 300, when it receives an image signal from the image signal output section 410, outputs the video image light L based on the image signal. The thus configured controller 400 instructs the screen control section 420 to control the operation of driving the screen 2 in response to instructing the image signal output section 410 to output the image signal to the projector 300. Specifically, in a state in which the image signal output section 410 outputs no image signal, the controller 400 instructs the screen control section 420 to drive the screen 2 in the second state, that is, the transmission (transparent) state. Conversely, in a state in which the image signal output section 410 outputs an image signal, the controller 400 instructs the screen control section 420 to drive the screen 2 in the first state, that is, the first liquid crystal layer area S1 to operate in the scatter state and the second liquid crystal layer area S2 to operate in the colored state.

The control described above allows the screen 2 to operate in the second state when the projector 300 outputs no video image light L, that is, when no image to be displayed on the screen 2 is present. On the other hand, the control described above allows the screen 2 to operate in the first state when the projector 300 outputs the video image light L, whereby an image corresponding to the video image light L can be displayed in the first liquid crystal layer area S1 of the screen 2. That is, the simple control described above allows the screen 2 to operate in the transmission state whenever no image is displayed on the screen 2, whereby power can be saved and a feeling of oppression produced in a space where the viewer lives can be reduced.

Second Embodiment

A screen according to a second embodiment of the invention will next be described.

Figure 6:
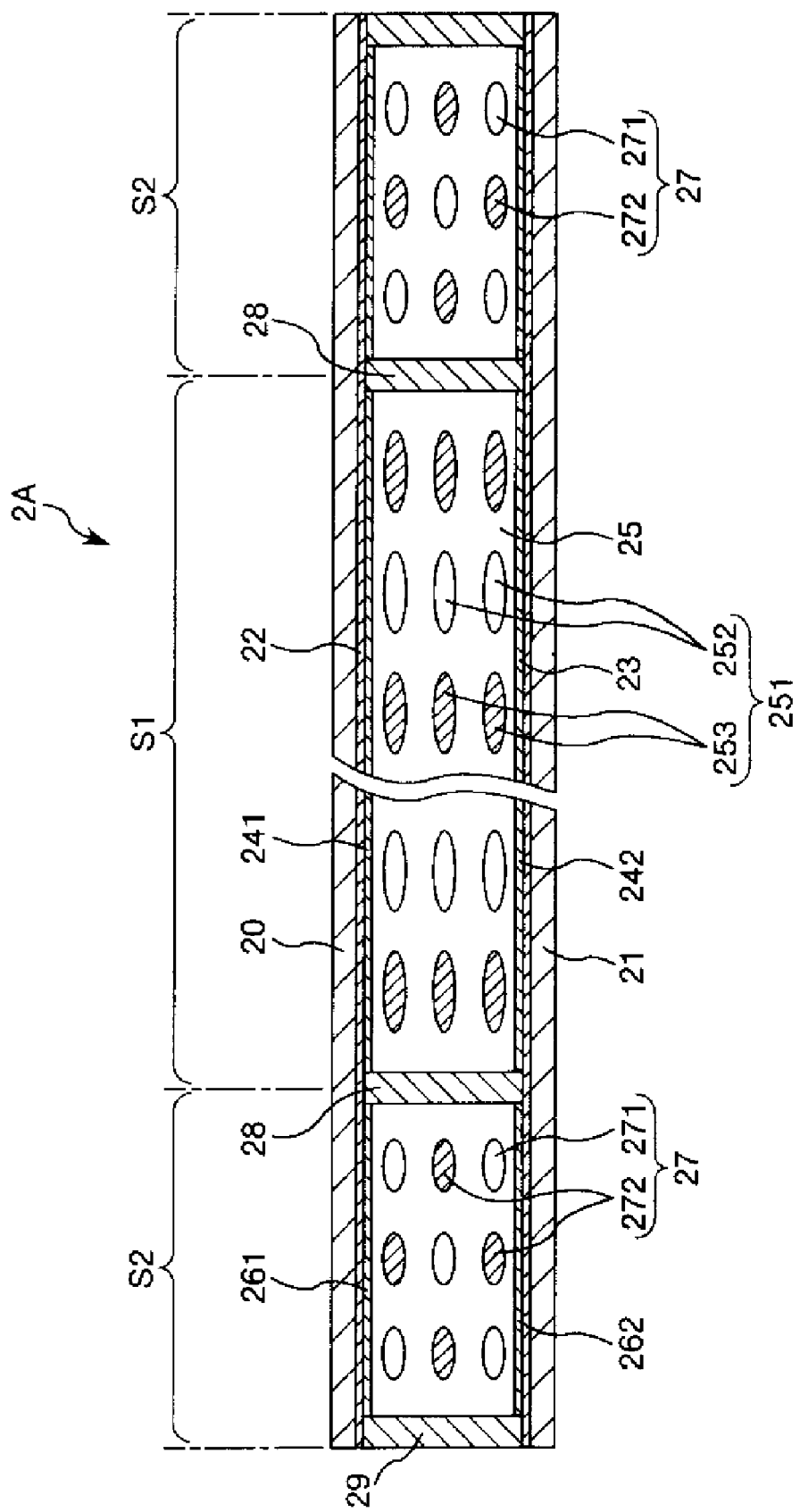
FIG. 6 is a cross-sectional view of a screen according to a second embodiment of the invention.

FIG. 6 is a cross-sectional view of the screen according to the second embodiment of the invention.

The screen according to the second embodiment will be described below primarily on differences from the embodiment described above, and similar items will not be described.

The screen according to the second embodiment of the invention is substantially the same as that according to the first embodiment described above and only differs therefrom in terms of drive mode. The same components as those in the first embodiment described above have the same reference characters. In a screen 2A according to the present embodiment, the PDLC 251 that forms the first liquid crystal layer 25 is of normal type, as shown in FIG. 6. The first liquid crystal layer 25 therefore operates in the scatter state in the no voltage applied state, whereas operating in the transmission state in the voltage applied state. On the other hand, the second liquid crystal layer 27 is of TN (twisted nematic) type. The second liquid crystal layer 27 therefore operates in the colored state in the no voltage applied state, whereas operating in the transmission state in the voltage applied state. The second liquid crystal layer 27 is not necessarily of TN type and may alternatively be of any type that provides the colored state in the no voltage applied state whereas operating in the transmission state in the voltage applied state.

The thus configured screen 2A can operate in one of the following states at a time: an electric field created state in which a voltage is applied between the transparent electrodes 22 and 23 and an electric field acts on the first liquid crystal layer area S1 and the second liquid crystal layer area S2 and a no electric field created state in which no voltage is applied between the transparent electrodes 22 and 23 and no electric field acts on the first liquid crystal layer area S1 or the second liquid crystal layer area S2.

In the no electric field created state, the first liquid crystal layer area S1 operates in the scatter state, and the second liquid crystal layer area S2 operates in the colored state. An image can therefore be displayed in the first liquid crystal layer area S1. Further, the displayed image can be surrounded by the black frame formed of the second liquid crystal layer area S2. Conversely, in the electric field created state, the first liquid crystal layer area S1 and the second liquid crystal layer area S2 both operate in the transmission state. The entire screen 2A thus operates in the transparent state. The second embodiment described above also provides the same advantageous effects as those provided by the first embodiment. It is noted that the screen 2A is suitably used in an application in which the period during which an image is displayed on the screen 2A (period during which screen 2A operates in first state) is longer than the period during which no image is displayed on the screen 2A (period during which screen 2A operates in second state). The screen 2A can thus be driven in a power-saving mode.

Third Embodiment

A screen according to a third embodiment of the invention will next be described.

Figure 7:
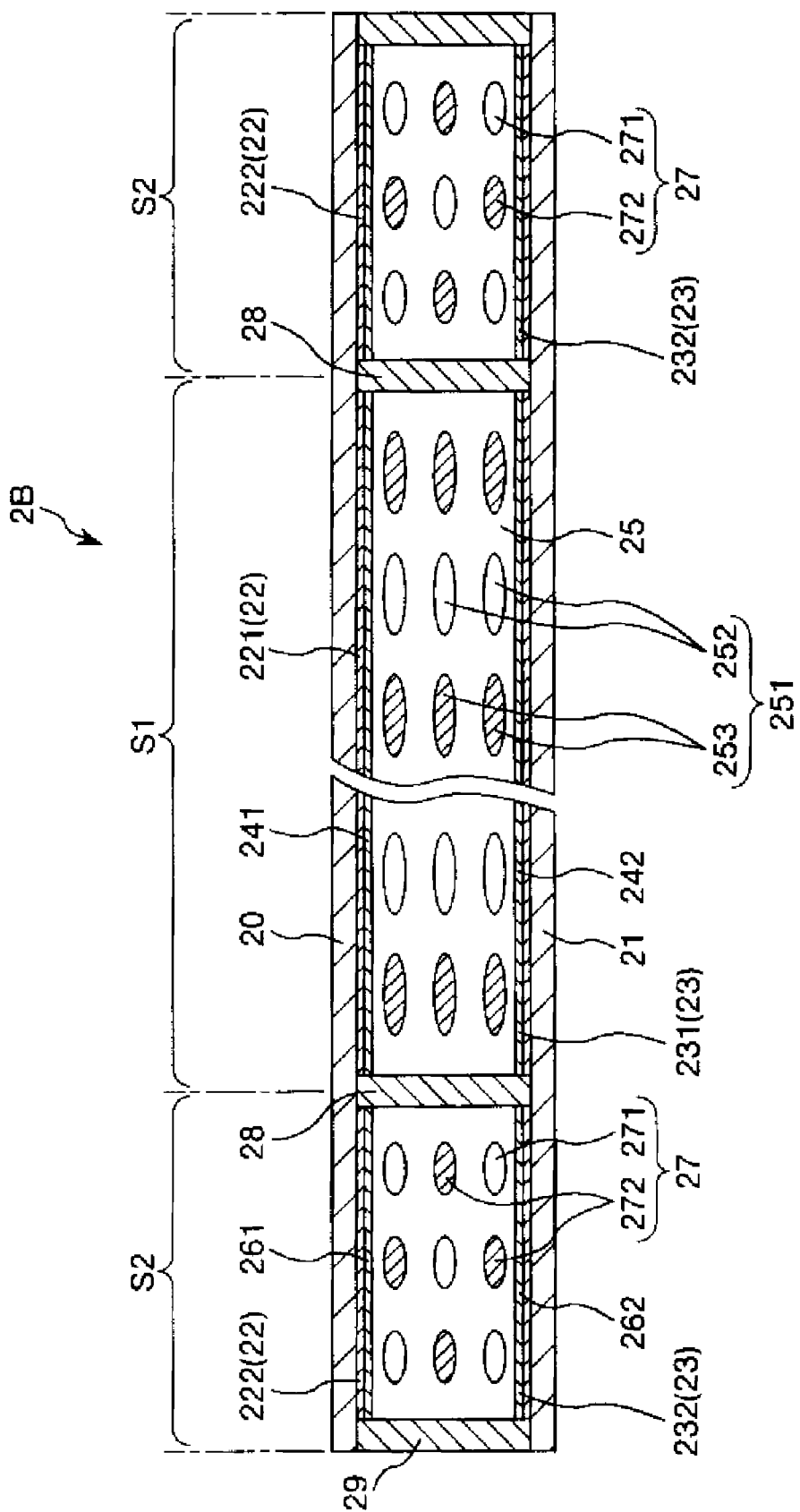
FIG. 7 is a cross-sectional view of a screen according to a third embodiment of the invention.

FIG. 7 is a cross-sectional view of the screen according to the third embodiment of the invention.

The screen according to the third embodiment will be described below primarily on differences from the embodiments described above, and similar items will not be described.

The screen according to the third embodiment of the invention is substantially the same as that according to the first embodiment described above and only differs therefrom in terms of electrode configuration. The same components as those in the first embodiment described above have the same reference characters.

A screen 2B includes a pair of first transparent electrodes 221 and 231 that sandwich the first liquid crystal layer area S1 and a pair of second transparent electrodes 222 and 232 that sandwich the second liquid crystal layer area S2, as shown in FIG. 7. In other words, the transparent electrodes 22 and 23 are divided into portions in the first liquid crystal layer area S1 and portions in the second liquid crystal layer area S2.

In the screen 2B, voltage application between the pair of first transparent electrodes 221 and 231 and voltage application between the pair of second transparent electrodes 222 and 232 can be performed independently of each other. The state of the first liquid crystal layer area S1 and the state of the second liquid crystal layer area S2 can therefore be controlled independently of each other.

The screen 2B can operate in one of the following states at a time as in the first embodiment described above: the first state, in which the first liquid crystal layer area S1 operates in the scatter state and the second liquid crystal layer area S2 operates in the colored state, and the second state, in which the first liquid crystal layer area S1 and the second liquid crystal layer area S2 both operate in the transmission state. Further, the screen 2B according to the present embodiment can operate in a third state in which the second liquid crystal layer area S2 operates in the colored state as in the first state but the first liquid crystal layer area S1 scatters light at a rate between those in the first and second states (intermediate rate), in other words, a state in which the degree of light scattering in the first liquid crystal layer area S1 is changed from that in the second state. The degree of light scattering in the third state can be adjusted continuously or discretely in multiple steps by changing the voltage applied between the transparent electrodes 221 and 231.

The third state is advantageous, for example, when the background behind the screen 2B and an image displayed in the first liquid crystal layer area S1 are desired (allowed) to be visible at the same time. That is, since the first liquid crystal layer area S1 is semitransparent in the third state, the background behind the first liquid crystal layer area S1 can be visible and an image can be displayed in the first liquid crystal layer area at the same time. Further, since the second liquid crystal layer area S2 operates in the colored state (black state) as in the first state, an image displayed in the first liquid crystal layer area can give an increased contrast sensation.

The third state is not necessarily used in a specific application and can be used, for example, in a case where an exhibition product is placed behind the screen 2B and information on the exhibition product is displayed in the first liquid crystal layer area of the screen 2B. The information can thus be effectively displayed without obstructing the observation of the exhibition product.

The third embodiment described above also provides the same advantageous effects as those provided by the first embodiment. In the screen 2B according to the present embodiment, since the state of the first liquid crystal layer area S1 and the state of the second liquid crystal layer area S2 can be controlled independently of each other, the types of the first liquid crystal layer area S1 and the second liquid crystal layer area S2 can be combined in any way, unlike in the first and second embodiments described above. That is, the first liquid crystal layer area S1 may be of reverse type and the second liquid crystal layer area S2 may be of VA type as in the first embodiment, or the first liquid crystal layer area S1 may be of normal type and the second liquid crystal layer area S2 may be of TN type as in the second embodiment. Alternatively, the first liquid crystal layer area S1 may be of reverse type and the second liquid crystal layer area S2 may be of TN type, or the first liquid crystal layer area S1 may be of normal type and the second liquid crystal layer area S2 may be of VA type.

The screens and the image display system according to the embodiments of the invention have been described above with reference to the drawings, but the invention it not limited thereto. The configuration of each of the components can be replaced with an arbitrary configuration having the same function. Further, other arbitrary components may be added to the invention. Moreover, the embodiments may be combined with each other as appropriate.

The entire disclosure of Japanese Patent Application No. 2011-218329, filed Sep. 30, 2011 is expressly incorporated by reference herein.

What is claimed is:

1. A screen comprising:
a first liquid crystal layer area including a polymer dispersion liquid crystal material and capable of switching a state of the first liquid crystal layer area between a transmission state and a scatter state based on voltage application; and
a second liquid crystal layer area including a liquid crystal material and a dichromatic dye, and capable of switching a state of the second liquid crystal layer area between a transmission state and a colored state based on voltage application, wherein
the second liquid crystal layer area is disposed around the first liquid crystal layer area, such that the first liquid crystal layer area is framed by the second liquid crystal layer area,
in a first state, the first liquid crystal layer area operates in the scatter state and the second liquid crystal layer area operates in the colored state,
in a second state, the first liquid crystal layer area and the second liquid crystal layer area both operate in the transmission state, and
in the first state, an image is displayed in the first liquid crystal layer area and a predetermined color is displayed in the second liquid crystal layer area.

2. The screen according to claim 1,
wherein the voltages are applied by common electrodes to the first and second liquid crystal layer areas.

3. The screen according to claim 1,
wherein the first state is produced when the voltages are applied, and
the second state is produced when no voltage is applied.

4. The screen according to claim 1,
wherein the second state is produced when the voltages are applied, and
the first state is produced when no voltage is applied.

5. The screen according to claim 1,
wherein the voltages are applied by different electrodes independently of each other to the first and second liquid crystal layer areas.

6. The screen according to claim 1,
wherein the predetermined color displayed in the colored state is black.

7. An image display system comprising:
the screen according to claim 1;
a projector that displays an image on the screen; and
a controller that controls operation of driving the screen and the projector.

8. The image display system according to claim 7,
wherein the controller instructs the screen to operate in the first state, in which the first liquid crystal layer area operates in the scatter state and the second liquid crystal layer area operates in the colored state, in response to outputting an image signal to the projector.

9. The image display system according to claim 7,
wherein the controller instructs the screen to operate in the first state in response to outputting an image signal to the projector.

10. An image display system comprising:
the screen according to claim 2;
a projector that displays an image on the screen; and
a controller that controls operation of driving the screen and the projector.

11. The image display system according to claim 10, wherein the controller instructs the screen to operate in the first state, in which the first liquid crystal layer area operates in the scatter state and the second liquid crystal layer area operates in the colored state, in response to outputting an image signal to the projector.

12. An image display system comprising:
the screen according to claim 3;
a projector that displays an image on the screen; and
a controller that controls operation of driving the screen and the projector.

13. The image display system according to claim 12, wherein the controller instructs the screen to operate in the first state in response to outputting an image signal to the projector.

14. An image display system comprising:
the screen according to claim 5;
a projector that displays an image on the screen; and
a controller that controls operation of driving the screen and the projector.

15. The image display system according to claim 14, wherein the controller instructs the screen to operate in the first state, in which the first liquid crystal layer area operates in the scatter state and the second liquid crystal layer area operates in the colored state, in response to outputting an image signal to the projector.

16. An image display system comprising:
the screen according to claim 6;
a projector that displays an image on the screen; and
a controller that controls operation of driving the screen and the projector.

17. The image display system according to claim 16, wherein the controller instructs the screen to operate in the first state, in which the first liquid crystal layer area operates in the scatter state and the second liquid crystal layer area operates in the colored state, in response to outputting an image signal to the projector.

* * * * *